United States Patent [19]
Wang

[11] Patent Number: 5,354,609
[45] Date of Patent: Oct. 11, 1994

[54] TWO-COMPONENT PRIMERLESS MODIFIED URETHANE ADHESIVE FOR POWDER COATINGS

[75] Inventor: Chia L. Wang, Hudson, Ohio

[73] Assignee: GenCorp Inc., Fairlawn, Ohio

[21] Appl. No.: 877,940

[22] Filed: May 4, 1992

Related U.S. Application Data

[63] Continuation-in-part of Ser. No. 805,255, Dec. 9, 1991, Pat. No. 5,175,228.

[51] Int. Cl.$^5$ .............................................. B32B 7/12
[52] U.S. Cl. .......................... 428/317.5; 428/317.7; 428/327; 428/422.8; 428/423.1; 427/201; 427/314
[58] Field of Search .................. 428/317.5, 317.7, 327, 428/422.8, 423.1; 427/201, 314

[56] References Cited

U.S. PATENT DOCUMENTS

| | | | |
|---|---|---|---|
| 3,501,329 | 3/1970 | Kent | 117/33 |
| 3,714,127 | 1/1973 | Fabris et al. | 260/77.5 AM |
| 3,786,030 | 1/1974 | Rice | 260/22.5 |
| 3,886,122 | 5/1975 | Fabris et al. | 260/25 NP |
| 3,980,594 | 9/1976 | Fabris et al. | |
| 4,011,180 | 3/1977 | Lockwood | 428/317.5 |
| 4,247,676 | 1/1981 | Kimball | 528/49 |
| 4,336,298 | 6/1982 | Schwarz | 428/285 |
| 4,346,144 | 8/1982 | Craven | 428/335 |
| 4,373,082 | 2/1983 | Kimball et al. | 528/60 |
| 4,390,678 | 6/1983 | LaBelle et al. | 528/60 |
| 4,444,976 | 4/1984 | Rabito | 528/60 |
| 4,452,944 | 6/1984 | Dawdy | 525/126 |
| 4,552,934 | 11/1985 | Rabito et al. | 525/458 |
| 4,624,996 | 11/1986 | Rizk et al. | 525/453 |
| 4,636,425 | 1/1987 | Johnson et al. | 428/198 |
| 4,728,710 | 3/1988 | Goel | 528/58 |
| 4,743,672 | 5/1988 | Goel | 528/44 |
| 4,778,844 | 10/1988 | Blount | 524/706 |
| 4,876,308 | 10/1989 | Melby et al. | |
| 4,923,756 | 5/1990 | Chung et al. | |
| 4,931,487 | 6/1990 | Priester et al. | 521/163 |
| 4,954,199 | 9/1990 | Rains et al. | 156/331.7 |
| 5,002,806 | 3/1991 | Chung | |
| 5,128,433 | 7/1992 | LeCompte et al. | 528/60 |
| 5,164,473 | 11/1992 | Dormish et al. | 528/44 |
| 5,175,228 | 12/1992 | Wang et al. | 528/48 |

FOREIGN PATENT DOCUMENTS

| | | |
|---|---|---|
| 0063534 | 10/1982 | European Pat. Off. |
| 0248254 | 12/1987 | European Pat. Off. |
| 0328808 | 8/1989 | European Pat. Off. |
| 837120 | 6/1960 | United Kingdom |

OTHER PUBLICATIONS

"Polyurethane Elastomers with Hydrolytic and Thermooxidative Stability. I. Polyurethanes with N-Alkylated Polyamide Soft Blocks," Journal of Polymer Science, Part A: Polymer Chemistry, vol. 28, 1473-1482 (1990).

"Polyurethane Elastomers with Hydrolytic and Thermooxidative Stability. II. Polyurethanes with N-Alk- (List continued on next page.)

Primary Examiner—Stevan A. Resan
Attorney, Agent, or Firm—Robert F. Rywalski; Daniel J. Hudak; Frank C. Rote, Jr.

[57] ABSTRACT

A two component primerless modified urethane adhesive having good high temperature stability can be utilized to bond substrates such as sheet molded composites together which can be subsequently powder coated. The utilization of the modified adhesive generally results in the formation of channels between the cured adhesive and the sheet molded composite surface so that upon cure of the applied powder coating, volatiles can escape from the sheet molded composite thus preventing blistering of the powder paint coating. The prepolymer component of the modified urethane contains a reacted hydroxyl intermediate and has a significant excess of free isocyanate. The curative component contains a polyol curing agent, an amine sag resistant agent, a trimerization catalyst, a low amount of urethane catalyst, and optionally a phosphorus-type adhesion promoter and/or molecular sieves. The equivalent ratio of free NCO groups in the prepolymer component to OH groups plus any amine groups in the curative component is generally from about 1.2 to about 2.0.

17 Claims, 1 Drawing Sheet

OTHER PUBLICATIONS ylated Polyurethane Soft Blocks," Journal of Polymer Science: Part A: Polymer Chemistry, vol. 28, 3685–3699 (1990).

"Chemical Degradation of Polyurethane," V. Gajewski, 33rd Annual Polyurethane Technical Marketing Conference, Sep. 30–Oct. 3, 1990.

"Mechanisms of Thermal Decomposition in Totally Aromatic Polyurethanes," S. Foti, P. Maravigna, and G. Montaudo, Journal of Polymer Science: Polymer Chemistry Edition, vol. 19, 1679–1687 (1981).

"An Investigation of the Thermolysis Mechanism of Model Urethanes," K. J. Voorhees, F. D. Hileman, I. N. Einhorn and J. H. Futrell, Journal of Polymer Science: Polymer Chemistry Edition, vol. 16, 213–228 (1978).

"Thermal Stability of Isocyanate-Based Polymers. 2. Kinetics of the Thermal Dissociation of Model Urethane, Oxazolidone, and Isocyanurate Block Copolymer," P. I. Kordomenos, J. E. Kresta, and K. C. Frisch, Macromolecules, 1987, 20, 2077–2083.

"Thermal Stability of Isocyanate-Based Polymers. 1. Kinetics of the Thermal Dissociation of Urethane, Oxazolidone, and Isocyanurate Groups," P. I. Kordomenos and J. E. Kresta, Macromolecules, 1981, 14, 1434–1437.

"Side Reactions in the Formation of Polyurethanes: Stability of Reaction Products of Phenyl Isocyanate," M. Spirkova, M. Kubin, and K. Dusek, J. Macromol Sci.-Chem., A27(4), pp. 509–522 (1990).

"Mechanism of Thermal Degradation of Polyurethanes Investigated by Direct Pyrolysis in the Mass Spectrometer," A. Ballistreri, S. Foti, P. Maravigna, G. Montaudo, and E. Scamporrino, Journal of Polymer Science: Polymer Chemistry Edition, vol. 18, 1923–1931 (1980).

"Thermal Degradation of N-Substituted Polycarbamates," Elizabeth Dyer and Richard J. Hammond, Journal of Polymer Science: Part A, vol. 2, pp. 1–14 (1964).

"Thermal Degradation of the Polyurethane from 1,4-Butanediol and Methylene Bis(4-Phenyl Isocyanate)," N. Grassie and M. Zulfiqar, Journal of Polymer Science: Polymer Chemistry Edition, vol. 16, 1563–1574 (1978).

5,354,609

TWO-COMPONENT PRIMERLESS MODIFIED URETHANE ADHESIVE FOR POWDER COATINGS

CROSS REFERENCE

This application is a continuation-in-part of U.S. application Ser. No. 805,255, filed Dec. 9, 1991 now U.S. Pat. No. 5,175,228, for "Two-Component Primerless Urethane-Isocyanurate Adhesive Compositions Having High Temperature Resistance."

FIELD OF THE INVENTION

The present invention relates to a primerless, high temperature resistant urethane adhesive for the bonding of various substrates such as sheet molded composite (SMC) parts to which a powder paint coating is subsequently applied.

BACKGROUND OF THE INVENTION

Powder coating compositions are used to paint fiber reinforced substrates because they emit less volatile organic compounds than commercial paints. Commercially available urethane adhesives can be used but blisters form under the powder coating over the bonded areas when the SMC parts are heated to cure the powder coating. Heretofore, epoxy adhesives have been utilized successfully to bond sheet molded composites (SMC) parts which are powder coated but they have disadvantages such as high costs, high viscosity, and cohesive failure at about 82° C.

U.S. Pat. No. 4,876,308 to Melby et al. relates to a two-component type polyurethane adhesive. The curative component is a nitrogen-free liquid polyether or polyester in an amount such that in association with a urethane prepolymer component containing free NCO groups, the ratio of the free NCO groups in the prepolymer component to the OH groups and NH groups in said curative component is at least 1.2 and desirably at least 1.35.

SUMMARY OF THE INVENTION

The modified adhesive contains a prepolymer component and a curative component and is utilized to bond substrates such as SMC. The urethane prepolymer component contains a large excess of free isocyanate after reaction with a hydroxyl terminated intermediate compound. The curative component contains a hydroxyl curing agent, an amine sag resistant agent, and a trimerization catalyst. An effective amount of a urethane catalyst is also utilized. A phosphorus type adhesion promoter is optional, although generally desirable. Molecular sieves improve shelf life stability. Upon application and cure of the modified adhesive to the substrate, an open pore or channel structure is formed on the surface of the adhesive.

DETAILED DESCRIPTION OF THE INVENTION

Figure 1:
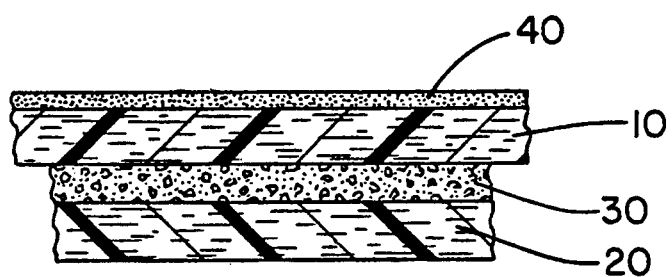
FIG. 1 relates to a cross-sectional view of a laminate wherein a powder coated fiber-reinforced substrate is adhered by an adhesive to a smaller fiber reinforced substrate, and FIG. 2 relates to a plan view of the adhesive surface bonded to the powder coated substrate showing the formed channel network system.

High Temperature Resistant Two Component Urethane Adhesive

The present invention is an uncured two part composition which contains a urethane prepolymer or base component and a curative component. The prepolymer component is made from a polyol intermediate and a large excess of a polyisocyanate so that free NCO groups exist on the ends of the urethane prepolymer or on unreacted polyisocyanates, etc. The prepolymer component can also contain various conventional additives or fillers.

The polyol intermediate is a liquid polyether polyol or a polyester polyol, or combinations thereof, having primary hydroxy groups, a number average molecular weight of from 400 to 10,000 and desirably from 2,000 to 9,000. A wide range of polyether or polyester polyols can be used in making the adhesives of the present invention such as diols, triois, tetrols, and the like.

Polyether polyols are generally made by reacting an alkylene oxide having from 2 to 10 carbon atoms such as propylene oxide with a strong base such as potassium hydroxide, preferably in the presence of water, glycols and so forth. Polyether polyols can also be made by ring opening polymerization of tetrahydrofuran or epichlorhydrin using acid catalysts. Except for polyols made from ethylene oxide or polytetrahydrofuran, to obtain primary hydroxyl end groups, they are generally end capped with ethylene oxide. Examples of polyethers which can be utilized are those which are produced as by polymerization of tetrahydrofuran or epoxides (such as ethylene oxide, propylene oxide, butylene oxide, styrene oxide, or epichlorohydrin), or by addition of epoxide compounds (preferably ethylene oxide or propylene oxide), alone, in a mixture, or in succession, to starting components with reactive hydrogen atoms such as water, polyhydric alcohols, ammonia or polyfunctional amines. Grafted polyether polyols such as those grafted with styrene or acrylonitrile can also be utilized. A preferred polyether intermediate is a polypropylene ether diol or triol containing primary hydroxyl end groups.

In order to achieve specific properties which are influenced by the composition and content of polyurethane hard blocks, small amounts of polyhydric alcohols having 2 to 15 carbon atoms are optionally utilized in combination with the above-noted liquid polyether or polyester glycol intermediates. The amount of polyhydric alcohols is generally from 0 to 40 parts by weight and preferably from 0 to 10 parts by weight based upon 100 parts by weight of the polyether polyol intermediate, the polyester polyol intermediate, or combinations thereof.

The polyisocyanates which are utilized generally have the formula $R(NCO)_n$ where n is an integer of 2, 3 or 4 with approximately 2 being preferred. Because combinations of various polyisocyanates can be utilized, the equivalent amount of isocyanate can vary and often is not an integer. R is an aliphatic having from 2 to 20 carbon atoms with from 6 to 15 carbon atoms being preferred, an aromatic including an alkyl substituted aromatic having from 6 to 20 carbon atoms with from 6 to 15 carbon atoms being preferred, or combinations thereof. Aromatic diisocyanates and aliphatic substituted aromatic diisocyanates are desired since the aliphatic diisocyanates generally react too slow. Examples of suitable polyisocyanates include 1,6-diisocyanato hexane, 2,2,4- and/or 2,4,4-trimethyl hexamethylene diisocyanate, p- and m-tetramethyl xylene diisocyanate, dicyclohexylmethane-4,4'-diisocyanate (hydrogenated MDI), 4,4-methylene diphenyl isocyanate (MDI), p- and m-phenylene diisocyanate, 2,4- and/or 2,6-toluene diisocyanate (TDI), durene-1,4-diisocyanate, isophorone diisocyanate, isopropylene-bis-(p-phenyl isocyanate) and sulfone-bis-(p-phenyl isocyanate). Any combination of diisocyanates can also be employed. Combinations of slower reacting aliphatic with faster reacting aromatic diisocyanates can be advantageously used.

It is an important aspect of the present invention that free isocyanate, that is free NCO groups exist e.g., on the end of the prepolymer or on unreacted polyisocyanates, etc. Accordingly, the equivalent ratio of the amount of polyisocyanate utilized to make the prepolymer to the hydroxyl containing polyol intermediate (NCO/OH) is generally from 2 to 75 or 50, desirably from 10 to 40, and preferably from 15 to 35.

Various known additives are generally contained in the base of the prepolymer component in conventional amounts. Additives such as antioxidants, various ultraviolet light inhibitors, thickening agents are utilized. Various fillers can also be utilized in conventional amounts. Examples of fillers which also serve to adjust the urethane prepolymer adhesive component viscosity include but are not limited to ground mica, talc, kaolin clay, calcium carbonate, calcium sulfite, silica, wollastonite, hollow glass microspheres, fibers, metallic oxides, ground quartz, metallic silicates and metallic powders. A preferred filler is talc. The amount of filler is generally an amount to produce a viscosity so that the prepolymer component can be readily pumped through processing equipment e.g., 5 to 100 parts by weight and preferably from 10 to 50 parts by weight per 100 parts by weight of the prepolymer.

Any conventional pigment or dye can be utilized in conventional amounts. Dyes, provided that they do not interfere with the various urethane reactions, can be utilized in either the prepolymer component, the curative component, or both.

The prepolymer component is made by adding the hydroxyl terminated polyol intermediate to a reactor along with the various additives. The reactor contents are heated, the ingredients mixed and a vacuum applied to remove moisture. The one or more polyisocyanates are added after moisture has been removed. In the absence of a catalyst, the formation of the prepolymer generally occurs at an elevated temperature, i.e., room temperature to about 150° C., with the temperature depending upon the specific type of hydroxyl terminated polyols and polyisocyanates. A urethane catalyst in the prepolymer component will cause the reaction to occur at a lower temperature.

The curative component generally contains a polyol curing agent which serves as a cross linking agent, a primary amine, and a trimerization catalyst. The polyol cross linking agent is free of nitrogen and can be the same as the intermediate polyol so described above utilized to form the prepolymer. An essential requirement of the polyol is that it be of a type such that a crosslinked polyurethane adhesive is formed upon cure of the adhesive composition. Thus, if the polyol intermediate and the polyisocyanate used to make the urethane prepolymer are essentially difunctional, the polyol curative should contain sufficient hydroxyls containing more than two OH groups per molecule so that a stable crosslinked network is formed when the curative is utilized. Alternatively, if either the intermediate polyol or the polyisocyanate used to make the prepolymer adhesive base has a functionality significantly greater than 2, the curative polyol may have a functionality of 2, or optionally greater than 2, to form the crosslinked network. Examples of curative polyols include a polyether or a polyester polyol having a number average molecular weight of from about 400 to about 10,000, desirably 2,000 to 9,000, such as the various above-noted polyol intermediates, or triols, tetrols, pentols, hexols. Also included within the definition of polyols according the present invention are the carbohydrates such as disaccharides and monosaccharides, along with reaction products thereof with alcohols having from 1 to 5 carbon atoms such as alkyl glucoside.

Examples of preferred polyol crosslinking agents include ethylene or propylene oxide adducts of trimethylol propane, pentaerythritol, glycerol, alkyl glucosides, or carbohydrates, with the propylene oxide adduct of pentaerythritol being preferred.

The curative component generally contains a primary aliphatic or aromatic amine which provides sag resistance after the prepolymer component is mixed with the curative component. The primary amine can be a di-or multifunctional primary amine having from about 1 to about 14 carbon atoms with 2 to 8 carbon atoms being preferred. Examples of suitable primary amine compounds include diethylenetriamine, ethylenediamine, tetramethylenediamine, pentamethylenediamine, hexamethylenediamine, 2,5-diamine-n-hexane, xylyene diamine, various naphthalene diamines such as 1,8-naphthalene diamine, and 1,3-diaminopropanol-2. The primary amine generally reacts with an equivalent amount of a free isocyanate group (NCO) in the prepolymer component to produce a polyurea. The reaction is generally very quick and the polyurea produced forms a strong hydrogen bonded network and significantly increases the viscosity of the mixed adhesive before cure and thereby provides sag resistance. An effective amount of the polyurea is utilized to prevent sag in the end product before it cures. An effective amount is generally from 0.1 to 5 parts by weight and preferably from 0.5 to 3 parts by weight per 100 parts by weight of the curative component.

An amount of the polyol curing or cross linking agent is utilized so that in association with the primary amine, the equivalent ratio of the free NCO groups of said prepolymer component to the curative OH $+NH_2$ groups of the curative component is from 1.2 to 2.0, desirably from 1.2 to 1.6 and preferably from 1.3 to 1.5. The utilization of a high excess of polyisocyanate results in various groups in addition to urethanes such as allophanate, biuret, carbodiimide, and the like. Such a high equivalent range results in a cured polyurethane adhesive which has good adhesion without the need of any surface pretreatment, i.e., the surface is treatment-free. By the term "treatment-free" it is meant that the substrate need not be further treated mechanically, with a solvent or with other chemical treatment. The adhesive is utilized to bond or adhere FRP to FRP, FRP to a metal, FRP to a painted metal, and FRP to various plastic substrates.

An important aspect of the present invention is the utilization of trimerization catalysts which have been found to impart improved high temperature stability to the adhesive.

Suitable catalysts are the various amines of the general formula

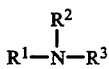

wherein $R^1$, $R^2$, and $R^3$, independently, is hydrogen or an alkyl having from 1 to 8 carbon atoms, or an aralkyl having a total of from 7 to 15 carbon atoms, with specific examples including $(C_2H_5)_3N$, $(CH_3)_2NCH_2C_6H_5$, and the like.

Another suitable trimerization catalyst family are the phosphines having the formula

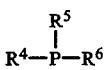

where $R^4$, $R^5$ and $R^6$, independently, is an alkyl having from 1 to 8 carbon atoms, with specific examples including triethyl phosphine, trimethyl phosphine, and the like.

Still another suitable catalyst group are the alkoxides represented by the formula $$R^7OM$$

where M is an alkali metal such as potassium, sodium, or lithium, or a borate, and $R^7$ is an alkyl having from 1 to 8 carbon atoms, with specific examples including $CH_3ONa$, $C_2H_5ONa$, and $C_4H_9OK$.

A still further suitable trimerization catalyst are the various metal oxides as generally represented by the formula $$MO$$

with a specific example being $Li_2O$.

Other catalysts are the hydroxides of quaternary N, P, As, Sb, such as $C_6H_5CH_2N(CH_3)_3OH$, the carboxylates as generally represented by the formula $$(R^8COO)_xM,$$

where M is K, Na, Ca, Fe, Mg, Hg, Ni, Co, Zn, Cr, Al, Sn, V, or Ti, where $R^8$ is H, an alkyl having from 1 to 10 carbon atoms, or an aryl alkaryl having from 6 to 15 carbon atoms and x is 1 to 6 with specific examples including $Ca(CH_3COO)_2$, $CH_3COOK$, $C_6H_5COONa$, $(C_3H_7COO)_4Ti$, $C_7H_{15}COOK$, and $HCOONa$, and various organometallics containing Zn, Si, Sn, Pb, or Sb, and O,N or S with specific examples including $R'_3Si-SR''$, $R'_3Sn-SR''$, $R'_3Sn-S-SnR''_3$, $R'_3Sn-OR''$, $R'_3Pb-NR''_2$, $R'_3Sb-(OR'')_2$, $R'_3Sb-(OCOR'')_2$, $R'Zn-OR''$, $R'Zn-NR''_2$, $(C_4H_9)_2Sn_nO$, where R' and R'', independently, is an alkyl, an aryl, or an alkenyl group having a total of from 1 to about 15 carbon atoms.

Still other suitable catalysts are the metal chelates such as diethyldipyridylnickel, bis(dipyridyl)nickel, tetrakis(trip-henylphosphine)nickel, hydrides such as $NaBH_4$ (sodium borohydride), $LiAlH_4$ (lithium aluminum hydride), sodium dihydrobis(2-methoxyethoxy)aluminum hydride, i.e.,

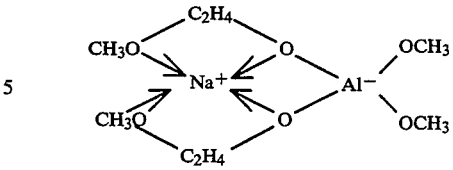

organic acids, inorganic acids, and Lewis acids, such as HCl, $(CO_2H)_2$, $AlCl_3$, and conventional Friedel-Crafts catalysts.

Another suitable trimerization catalyst are the various combination catalysts such as amines/epoxides, amines/alcohols, amines/alkylene carbonates, amines/alkylene imides, amines/carboxylic acids, amines/peroxides, ammonium hydroxides/carbamates.

Still another suitable trimerization catalyst are the a) sulfonium zwitterions as generally represented by the formula

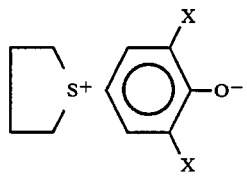

wherein X is H, Cl, an alkyl group having from 1 to 10 carbon atoms, and b) amine-imide zwitterions as generally represented by the formula

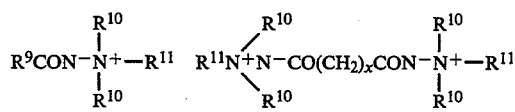

where x is from 2 to 16, $R^9$, and each $R^{10}$, independently, is an alkyl group having from 1 to 10 carbon atoms, and $R^{11}$ is $CH_2CH(OH)CH_3$, or $CH_2CH_2OH$.

Another suitable trimerization catalyst are the quaternary ammonium carboxylates as generally represented by the formula

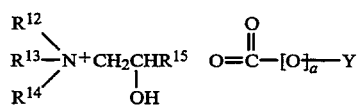

where a is 0 or 1,
where $R^{12}$, $R^{13}$, $R^{14}$, independently, is alkyl or hydroxyalkyl of $C_{1-20}$, cycloalkyl of $C_{3-8}$, aralkyl, aryl, alkenyl of $C_{2-20}$, alkynyl of $C_{2-6}$, with alkyl $C_1$ to $C_4$ being preferred;
$R^{15}$ is
H, phenyl, alkyl of $C_{1-15}$, alkenyl of $C_{2-15}$, alkynyl of $C_{2-6}$, hydroxy alkyl of $C_{1-9}$, ketoalkyl of $C_{3-15}$, alkoxy alkyl of akyl of $C_{2-20}$, with alkyl $C_1$ to $C_4$ preferred, and where
Y is H, alkyl of $C_{1-18}$, alkenyl of $C_{2-15}$, aromatic of $C_6$ to $C_{20}$ such as benzoate or methoxybenzyl, with alkyl $C_2$ to $C_{10}$ preferred.

A specific example of such a compound is TMR-2, manufactured by Air Products and Chemicals, Inc., which is trimethyl-2-hydroxypropyl ammonium 2-ethyl hexanoate. Related compounds include TMR, TMR-3, and TMR-4, wherein $R^{12}$, $R^{13}$ and $R^{14}$ is an alkyl independently having from 1 to 4 carbon atoms, $R^{15}$ is an alkyl having from 1 to 4 carbon atoms, and y is an alkyl having from 2 to 10, desirably 4 to 8 carbon atoms.

The quaternary ammonium carboxylates are preferred.

Other suitable trimerization catalysts include compounds such as 2,4,6 tris(dimethylaminomethyl)phenol
N,N'N"tris(dimethylaminopropyl)sym-hexahydrotriazine.

Examples of desirable trimerization catalyst include benzyl trimethylammonium hydroxide, benzyl trimethylammonium methoxide, potassium acetate, potassium ethoxide, potassium octoate, potassium phthaiimide, sodium dihydrobis (2-methoxy ethoxy) aluminum hydride, sodium ethoxide, sodium methoxide, 2,4,6 tris(-dimethylaminomethyl)phenol, N,N', N"tris(dimethylaminopropyl)symhexahydrotriazine, trimethyl-2-hydroxypropyl ammonium 2-ethyl hexanoate (TMR-2), and similar tertiary amines such as TMR, TMR-3 and TMR-4, which are trade secrets of Air Products, and tetramethylammonium-2-ethyl hexoate (TMAO), with trimethyl-2-hydroxypropyl ammonium 2-ethyl hexanoate being highly preferred.

The amount of the trimerization catalyst is from 0.01 to 1.0 percent by weight, desirably from 0.02 to 0.50 percent by weight, and preferably from 0.05 to 0.5 percent by weight based upon a total weight of the cure component.

The use of a urethane catalyst, which is generally a liquid, is optional. In combination with the trimerization catalysts, described above, urethane catalysts are used to adjust open time or pot life of mixed adhesives. Typically, a urethane catalyst is utilized, in the curative component, although it can be utilized in the prepolymer component, or in both components. Suitable urethane catalysts include tin catalysts such as stannous carboxylates and dialkyl tin salts of carboxylic acids, trialkyltin hydroxide, dialkyltin oxide, or dialkyltin chloride can be utilized. As an alternative or in addition to the above tin compounds, various tertiary amines can be used. Tin catalysts, when utilized, are used in amounts of 0.5 parts or less, i.e., in the range of 0.01 to 0.5 parts, by weight per 100 parts by weight of the component in which it is utilized, i.e., the curative component. The tertiary amine catalysts, when utilized, can be used in amounts of 0.01 to 5 parts by weight per 100 parts by weight of the component in which it is utilized. At least 0.01 part of at least one type of catalyst should be present. In addition to the above catalysts, organomercury or organic bismuth compounds wherein the organic portion is an aliphatic and preferably an alkyl having from 2 to 20 carbon atoms can be utilized in an amount from 0.01 to 1.0 parts by weight per 100 parts by weight of the prepolymer or curative component.

In addition to the above compounds optionally a small portion of the hydroxyl-terminated polyol intermediate utilized in the prepolymer component can also be contained within the curative component in an amount such that the total weight of the curative component is generally equal or relatively similar to the total weight of the prepolymer component. This aspect is for ease of application and ease of combining equal weight volumes of the two components. It is to be understood that any weight ratio of the curative component to the urethane prepolymer component can be utilized so long as the equivalent ratio of free NCO groups in the prepolymer component to curative OH and $NH_2$ groups of the curative component is within the above ranges, and the ratio of free NCO groups to the total OH groups of hydroxy-terminated polyol intermediate, regardless of its location, is as set forth above.

Another aspect of the present invention is use of a shelf life stabilizer in the two part urethane system. Generally, the stabilizer is in the curative component although it can be in the prepolymer component or both. Suitable shelf life stabilizer include molecular sieves. A specific example is Sylosiv 4 Å, an approximately 4 Å sodium, calcium, or potassium aluminosilicate molecular sieve available from W. R. Grace Company. The amount of stabilizer is generally from 0.1 to 15.0 percent by weight and preferably from 0.5 to 10 percent by weight based upon the weight of the curative component or system, or the prepolymer component or system.

Another aspect of this invention is the use of phosphorus-type adhesion promoters in the curative component or the base component, or both, to prevent adhesion loss after the urethane adhesive is applied to a part which is subjected to high temperature e.g., 400° F. (204° C.) for 1 hour. The phosphorus type compounds are generally liquid and include compounds represented by the formula

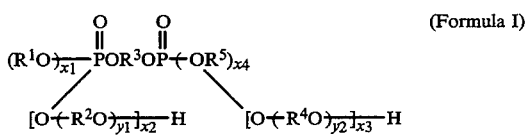
(Formula I)

where $R^1$, $R^3$, $R^5$, independently, is an alkyl having from 1 to 15 carbon atoms, wherein $R^2$ and $R^4$, independently, is an alkyl having from 1 to 6 carbon atoms, where $Y_1$ or $Y_2$, independently, is from 0 to 20, and wherein $x_1+x_2=2$, wherein $x_3+x_4=2$; and wherein $x_1$, $x_2$, $x_3$, or $x_4$ is 0, 1, or 2. A specific example of such a compound is Vircol-82 manufactured by Allbright and Wilson Corporation and has the formula

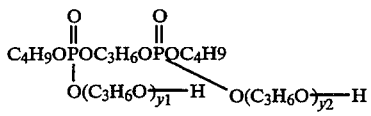

having a molecular weight of about 548 and $y_1+Y_2=3.4$. Another phosphorus type compound can be represented by the formula

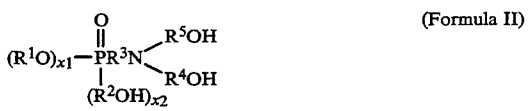
(Formula II)

wherein $R^1$, $R^2$, $R^3$, $R^4$, and $R^5$, independently, is an alkyl having from 1 to 15 carbon atoms, where $x_1+x_2=2$, and $x_1$ and $x_2$, independently, is 0, 1, or 2. A specific example of such a compound is Fyrol-6 which is manufactured by the Akzo Chemicals, Inc. Corporation and has the formula

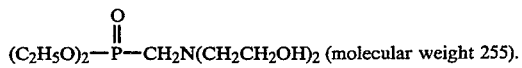

Another suitable compound has the specific formula

(HOCH$_2$)$_2$$\overset{\text{O}}{\overset{\|}{\text{P}}}$—CH$_2$N(CH$_2$CH$_2$OH)$_2$ (molecular weight 227).

Another phosphorus type adhesion promoter is represented by the formula

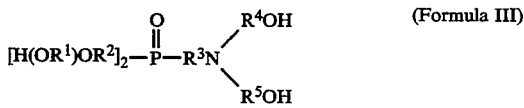

$$[H(OR^1)OR^2]_2-\overset{O}{\overset{\|}{P}}-R^3N\begin{matrix}R^4OH\\ \\R^5OH\end{matrix} \quad \text{(Formula III)}$$

wherein $R^1$, $R^2$, $R^4$, and $R^5$, independently is an alkyl having from 1 to 8 carbon atoms, and $R^3$ is hydrogen or an alkyl having 1 to 8 carbon atoms. A specific example is

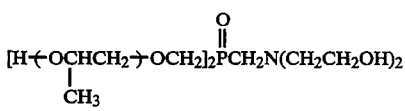

$$[H\text{-}(OCHCH_2\text{-})OCH_2]_2\overset{O}{\overset{\|}{P}}CH_2N(CH_2CH_2OH)_2$$
$$\quad\quad\quad\;\;|$$
$$\quad\quad\quad\;\;CH_3$$

Yet another type of a phosphorus type adhesion promoter is represented by the formula

$$(HOR^1)_x\overset{O}{\overset{\|}{P}}-(R^2)_y \quad \text{(Formula IV)}$$

wherein $R^1$ is an alkyl having from 1 to 8 carbon atoms, and $R^2$ is nonexistent or an alkyl having from 1 to 8 carbon atoms, and wherein x is 1, 2, or 3, and wherein y is 0, 1, or 2, and wherein $x+y=3$. Specific examples include

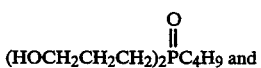

$$(HOCH_2CH_2CH_2)_2\overset{O}{\overset{\|}{P}}C_4H_9 \text{ and}$$

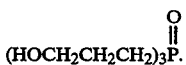

$$(HOCH_2CH_2CH_2)_3\overset{O}{\overset{\|}{P}}.$$

The amount of the phosphorus-containing compounds is generally from about 0.1 to about 15 percent by weight and preferably from 0.5 to 10 percent by weight based upon the total weight of the curative component or system, or from about 0.05 to 7.5 percent by weight and preferably from 0.25 percent to 5 percent by weight based upon the total weight of the curative component and the prepolymer component.

As with the urethane prepolymer component, the curative component can contain various additives, pigments, dyes, fillers, and the like. Such compounds can be utilized in either or both components. Generally, the curative component contains significant amounts of fillers of the type described for use in the urethane prepolymer component. Fumed silica is often utilized to prevent the fillers from settling out. Various pigments and or dyes can be utilized such as those discussed in connection with the urethane prepolymer component. Various other additives can also be used within the curative component.

The ingredients of the curative component are liquid and can be added and mixed in any manner.

The two components of the urethane system are separately maintained. The adhesive is made by blending the two components together utilizing any conventional mixer or blender, etc., the heating to cure and form the adhesive. The cure temperature will vary depending upon the types of ingredients of each component, but generally is from 150° F. to 300° (66° to 149° C.), and preferably from 200° to 250° F. (93° to 121° C.). Mixing time is less than 10 minutes and often from 1 to 4 minutes.

The system is applied to a non-treated or surface treatment free substrate, e.g., a primerless substrate such as FRP, metal or plastic and heated to cure and form an in situ adhesive which bonds said substrates together to form a urethane adhesive composite. The two-component system and urethane adhesive of the present invention is particularly suitable for use in the manufacture of automotive hoods, doors, fenders, front ends, trunk lids, body panels, and the like.

The present invention will be better understood by reference to the following examples which serve to illustrate the invention, but not to limit the same.

EXAMPLES

All parts set forth in the examples are by weight unless otherwise indicated.

Example 1

A polyurethane prepolymer was prepared using the following procedure: polypropylene ether triol capped with ethylene oxide, 6000–7000 molecular weight (29 parts), antioxidant (0.4 parts), and fumed silica (0.5 parts) were charged to a clean, dry reactor.

The reactor and its contents were heated with stirring to 110° C. During the heating cycle, powdered talc (13.5 parts) and molecular sieves (5 parts) were added. The reactor was heated to 70°–110° C. under vacuum (26 inches mercury) for 2 hours. Then, 52 parts of liquid methylene bis (4-phenylisocyanate) (Isonate 2191, Modified MDI, manufactured by Dow) was added. The contents of the reactor were mixed for 2 hours at 60°–110° C. The NCO content of the final product is 3.5 meq/gm and the viscosity was 4,000–8,000 cps (Brookfield). The adhesive base was used in all subsequent experiments.

Example 2

A polyurethane curative was prepared using the following procedure: A polypropylene ether triol with 21 weight percent grafted acrylonitrile (34 parts), polypropylene ether tetrol of 500 molecular weight (PEP-550, manufactured by BASF) (28.5 parts), phthalocyanine blue (0.7 parts), naphthalene diamine (1.0 parts), fumed silica (0.4 parts), and phosphorus containing polyol Vircol-82 (8.0 parts) were charged to a clean, dry reactor, the reactor was heated to 110° C. while adding powdered talc (30–40 parts). The slurry was heated at 70°–110° C. under vacuum for 2 hours. Then, tin catalyst (0.1–1 parts) was added. The final mixture was stirred and cooled to 30° C. It had a viscosity of 15,000–30,000 cps (Brookfield). This curative was used with the adhesive base described in Example 1 at a base/curative mix ratio of 1/1 to form the final polyurethane adhesive.

Two Component Primerless Modified Urethane Adhesive For Use With Substrates Having Powder Coatings The two component primerless modified urethane adhesive utilized in association with SMC parts or other fiber reinforced composites or substrates which can be subsequently painted with powder coatings is generally the same as set forth with the exceptions of various modifications set forth herein below.

It has been found that the primerless modified urethane adhesive must contain a trimerization catalyst, otherwise, blisters will occur. It has furthermore been found that generally excessive amounts of urethane catalyst will not eliminate blisters but unexpectedly lesser amounts, that is, amounts generally less than normally required.

The modified urethane adhesive generally utilizes the same prepolymer as noted above except that the polyol intermediate need not be limited to primary hydroxyl groups but may also contain secondary end groups. An example of a secondary hydroxyl end group containing compound is PPG-3025, a polypropylene oxide-based polyether diol, molecular weight 3,000, which contains only secondary hydroxyl group. The hereinabove described polyether polyols are the preferred polyol intermediate with specific examples including polypropylene ether diols or triols containing primary or secondary end groups and optionally containing grafted acrylonitrile, as well as mixtures thereof. The polyisocyanates utilized in the prepolymer component of the modified adhesive are the same as set forth hereinabove as is the very high excess ratio of NCO to OH groups so that the prepolymer contains free NCO groups. As noted above, such a ratio is generally from about 2 to about 75 or 50, desirably from about 10 to about 40, and preferably from about 15 to about 35. Preferred polyisocyanates include the various diphenylmethane diisocyanates (MDI) and mixtures of MDI with polymeric MDI having an average isocyanate functionality of from about 2 to about 3.2.

The modified primerless polyurethane adhesive of the present invention generally contains the same compounds in the curing component as noted above such as a polyol triol, tetrol, etc., curing agent which generally serves as a crosslinking agent, a primary amine anti-sag agent, and a trimerization catalyst. The modified urethane adhesive contains a sufficient amount of primary amine compounds and polyol curing or crosslinking agents so that the equivalent ratio of the free NCO groups of the prepolymer component to the OH plus amine groups of the anti-sag agent is from about 1.1 to about 2.0, desirably from about 1.2 to about 1.6, and preferably from about 1.25 to about 1.5. Such ratio is generally given in terms of an isocyanate index which is defined as follows:

$$\text{Isocyanate Index} = \frac{\text{Equivalents of NCO groups in prepolymer component} \times 100}{\text{Equivalents of OH and NH}_2 \text{ groups in the curative component}}.$$

An important aspect of the present invention is to utilize an amount of the urethane catalyst which will result in the formation of tiny channels on the surface of the modified urethane adhesive when utilized in association with SMC or other reinforced thermoplastic or thermoset compound. Such catalyst generally includes a tertiary amine catalyst such as triethylamine, benzyldimethylamine, triethylenediamine or tetramethylbutanediamine. Other suitable urethane catalysts, as noted above, include various tin compounds known to the art such as stannous carboxylates, for example, stannous acetate, stannous octoate, stannous laurate, stannous oleate; or dialkyl tin salts of carboxylic acids such as dibutyltin diacetate, dibutyltin dilaurate, dibutyltin maleate, dibutyltin disulfide, dibutyltin di-2-ethylhexoate, dilauryltin diacetate and dioctyltin diacetate. Dibutyltin disulfide and dibutyltin dilaurate are preferred.

The amount of urethane catalyst utilized is important inasmuch as an excess will prevent the formation of tiny channels which are necessary to obtain blister free powder paint coatings. The amount of the urethane catalyst generally ranges from about 0.0; that is, none, or 1 percent up to 70 percent, desirably from 30 percent to 65 percent, and preferably from 50 percent to 60 percent of the total or normally required amount of the urethane catalysts. Typically, the 100 percent required amount is from about 0.05 to about 0.07 weight percent and preferably about 0.06 percent weight percent based upon of the total weight of the essential components of the blended urethane adhesive composition; that is, the urethane prepolymer containing excess NCO groups, the one or more polyol curing agents, the various trimerization catalysts, and the amine anti-sag agent. Not included within the essential components are various solvents, pigments, molecular sieves, phosphorus adhesion promoters, and the like. The 100 percent required or normal amount of urethane catalyst will vary somewhat depending upon the specific type of trimerization catalyst, amine curing agent, polyol curing agent, as well as the specific type of components forming the urethane prepolymer.

The reason why the utilization of a deficient or partial amount of urethane catalyst results in powder coated blister-free products is not fully understood. However, it is thought that deficient or partial amounts of catalysts result in the formation of carbon dioxide which forms channels on the surface of the cured adhesive.

Although generally free from, optionally, the modified polyurethane adhesive can also contain a phosphorus-type adhesion promoter of the type and in the amount as set forth as well as a shelf stabilizer such as various molecular sieves described above. The modified urethane adhesive prepolymer component can also contain various additives, pigments, dyes, fillers, and the like, as noted above.

The modified urethane adhesive can be utilized to bond a variety of substrates such as SMC, or thermoset or thermoplastic parts reinforced with various fibers (FRP) i.e., fiber-reinforced plastic such as glass, boron, carbon, graphite, or nylon, i.e. aramid fibers. The modified urethane adhesives of the present invention can also be utilized to bond other substrates including non-plastic substrates such as metal parts, housing, or the like. Such substrates are subsequently subjected to powdered paint coating techniques.

When the modified urethane adhesive containing a partial amount of catalyst is applied to one or more substrates and cured or substantially cured, tiny channels, pores or voids are generally formed along the interface, i.e. surface, between the modified urethane adhesive and the substrate(s). The channels are generally in the form of an open channel network or structure which extends to the edges of the adhesive although some of the channels, generally a small amount, will terminate within the adhesive. Such an open channel network permits volatiles such as air, moisture gases (e.g. solvent), etc., to be vented from the substrate in subsequent heating operations. Thus, if a powder paint coating is applied to the substrate, for example an SMC part, the powder can be melted to form a paint coating with the volatiles of the SMC part escaping through the formed channels. The result is an unexpected substantially reduced and generally blister-free powder coated painted surface. Other advantages of the modified urethane adhesive of the present invention include strong adhesion with the substrate and good green strength, e.g. when tested at 270° F. after approximately 1 minute. The modified urethane adhesive also has improved resistance.

Substrates bonded together with the cured modified adhesive of the present invention can be prepared for the application of a powdered paint coating thereto. Such a procedure generally involves washing the bonded substrates with a conventional soap or detergent solution well known to the art, for example, 2 percent DETREX 2100 L (a mixture of surfactants including phosphoric acid), manufactured by Detrex Corporation, to clean the substrates. The substrates are then heated to a temperature slightly higher than the cure temperature of the powder coating, as for example 250° to 450° F. (121° to 232° C.), desirably from 300° to 400° F. (149° to 204° C.) as for about 15 to 60 minutes. Conventional powder paint coatings can then be applied to the heated substrates which are maintained at a temperature above the powder coating cure temperature and cured at conventional curing temperatures such as from 250° to 370° F. (121° to 188° C.) for 15 to 60 minutes. Naturally, the preheat temperature of the substrates as well as the powder coating cure temperature will vary depending upon the exact type of powder coating applied. Specific types of powder coatings are known to the art and include a thermosetting epoxy resin such as an acrylic polymer containing an epoxy group and a polyacid curing agent, a thermosetting polyester resin group such as a polyester containing an acid group and a triglycidyl isocyanurate curing agent, and thermosetting acrylic resins such as an acrylic polymer containing an acid group and an aliphatic dicarboxylic acid. An example of a thermosetting polyester resin is 153E-114 Polyester manufactured by The Glidden Company, whereas examples of thermosetting acrylic resins include PCC90111 ENVIRACRYL, manufactured by PPG, PCC80111 ENVIRACRYL, manufactured by PPG, and 158E-114 Acrylic manufactured by The Glidden Company.

Figure 2:
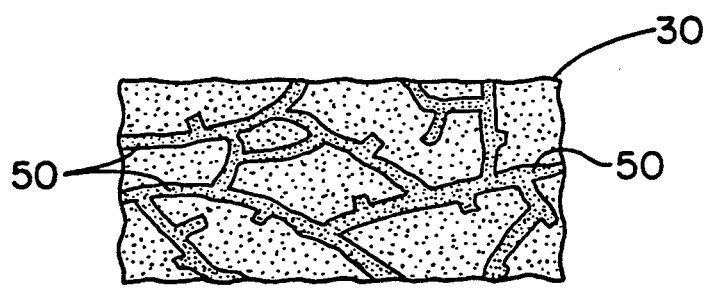

Reference to FIGS. 1 and 2 serve to illustrate the nature of the present invention. Fiberglass reinforced substrate 10 is bonded by the modified adhesive of the present invention containing a partial amount of the urethane catalyst therein to a second fiber reinforced substrate 20. Upon cure of the adhesive, an open network or channel system is formed at the interfaces between adhesive 30 and substrate 10 as well as between 30 and substrate 20. As apparent from FIG. 2, the channel network formed on the surfaces of the adhesives contacting each of the substrates generally contains an open channel network so that subsequently, that is upon application of a powdered paint coating 40 to at least one of the substrates and upon cure thereof, volatile gases such as moisture, air, and the like can escape from the substrate such as a fiber reinforced plastic through the open channel network so that no blistering occurs upon the cure of powder paint coating 40.

The modified primerless polyurethane adhesive of the present invention can be utilized in situations as set forth hereinabove whenever a powdered coating paint is utilized and thus is suitable for use in the manufacture of automobile hoods having reinforcing substrates, doors, fendors, body panels, trunk lids, and the like.

Example 3

Polyurethane prepolymers A1-A4 were synthesized according to the procedures of Example 1. The formulations (parts by weight) of A1-A4 were as follows:

TABLE I

| Base | A1 | A2 | A3 | A4 |
|---|---|---|---|---|
| Polypropylene ether Triol | 29 | 29 | 26 | 26.7 |
| Isocyanate (MDI) | 51.6 | 51.6 | 51.6 | 47.5 |
| Antioxidant | 0.4 | 0.2 | 0.2 | 0.2 |
| Fumed Silica | 0.5 | 0.5 | 1.6 | 1.1 |
| Fillers (Talc) | 18.5 | 18.7 | 20.6 | 24.5 |

Example 4

Polyurethane curatives B1-B12 were prepared using the procedure of Example 2. The formulations (parts by weight) of B1-B12 were as follows:

TABLE II

| Curative | B1 | B2 | B3 | B4 | B5 | B6 | B7 | B8 | B9 | B10 | B11 | B12 |
|---|---|---|---|---|---|---|---|---|---|---|---|---|
| Polyol 1 | 34.2 | 34.2 | 34.2 | — | — | — | — | 34.2 | 34.2 | — | 34.2 | 32.9 |
| Polyol 2 | — | — | — | 37.2 | 37.2 | 37.2 | 36.7 | — | — | 33.2 | — | — |
| Polyol 3 | 28.4 | 28.4 | 28.4 | 27.8 | 27.8 | 27.8 | 27.9 | 28.4 | 28.4 | 32.5 | 28.5 | 25.4 |
| Amine (1,8-naphthalene diamine) | 0.6 | 0.6 | 0.7 | 0.7 | 0.7 | 0.7 | 0.7 | 0.7 | 0.7 | 0.7 | 0.6 | 0.7 |
| Blue Pigment | 0.7 | 0.7 | 0.7 | 0.7 | 0.7 | 0.7 | 0.7 | 0.7 | 0.7 | 0.7 | 0.7 | 0.7 |
| Fillers (talc) | 34.5 | 34.4 | 34.3 | 31 | 31 | 31 | 31.4 | 33.3 | 33.4 | 30.5 | 34.4 | 34.1 |
| Phosphorus Polyol Vircol-82 | 1.5 | 1.5 | 1.5 | 2.5 | 2.5 | 2.5 | 2.5 | 1.5 | 1.5 | 1.8 | 1.5 | 6 |
| A-1120 Silane | — | — | — | — | — | — | — | 1 | 1 | — | — | — |
| Urethane Catalyst (Dibutyltin Disulfide) | — | — | — | 0.014 | 0.02 | 0.029 | 0.01 | — | 0.01 | 0.032 | 0.04 | 0.2 |
| TMR | 0.15 | — | 0.15 | 0.076 | 0.072 | 0.07 | 0.079 | 0.15 | 0.1 | 0.075 | 0.078 | — |
| TMAO | — | 0.28 | — | — | — | — | — | — | — | — | — | — |
| Partial amount of urethane catalysts | — | — | — | 33% | 48% | 69% | 24% | — | 24% | 76% | 96% | — |

Polyol 1 = Polypropylene ether triol with grafted acrylonitrile
Polyol 2 = Polypropylene ether triol (MW = 6,000-7,000)
Polyol 3 = Polypropylene ether tetrol
A-1120 = N-beta-(aminoethyl)-gamma-aminopropyltrimethoxysilane, Union Carbide

COATING AND CURING PROCEDURE

The method of coating a fiber-reinforced plastic substrate with a powder coating composition was as follows: The plastic substrate was preheated at a temperature above that sufficient to cure a subsequently applied powder coating composition. The times and temperatures for this preheating step will vary somewhat depending on the identity of the substrate and the powder coating compositions but were 300° F.–400° F. (149°–204° C.) for 15–60 minutes. After the preheating step, the powder coating composition was immediately (i.e., before the substrate cools below the curing temperature) applied to the preheated substrate. The conventional powder coating technique is preferably electrostatic spraying. A total film thickness was preferably from 3–6 mils. After the powder coating composition has been applied, the coated substrate was then heated immediately (i.e., before the substrate cools below the curing temperature of the powder coating composition) at a temperature and for a time sufficient to cure the powder coating composition. The curing times and temperatures will vary somewhat depending on the powder coating composition. The curing temperatures were 250°–370° F. (121°–188° C.) for 15–60 minutes.

Example 5

As apparent from Table III, the utilization of partial amounts of urethane catalysts result in improved green strength and yet no blistering is observed. The notation "pass" with regard to the powder coating means that no blisters were observed.

TABLE III

| Effect of Urethane Catalysts | | | | | |
|---|---|---|---|---|---|
| Base | A2 | A3 | A3 | A3 | A1 |
| Curative | B3 | B4 | B5 | B6 | B11 |
| Isocyanate Index | 135 | 135 | 135 | 135 | 135 |
| Urethane Catalyst (wt. %) | None | 0.014 | 0.020 | 0.029 | 0.04 |
| TMR (Trimer Catalyst) | 0.15 | 0.076 | 0.072 | 0.070 | 0.078 |
| Cross Pull at 270° F. (Green Strength) | 120 sec. 59 psi (407 kpa) | 75 sec. 70 psi (483 kpa) | 60 sec. 76 psi (524 kpa) | 55 sec. 60 psi (414 kpa) | — — |
| Waiting period between adhesive bonding and coating | — | 80 min. | 70 min. | 60 min. | — |
| Powder Coating | Pass | Pass | Pass | Pass | Fail |

Example 6

The formation of tiny channels on the surface of modified urethane adhesive doesn't affect the adhesion performance of the adhesive as shown in Table IV.

TABLE IV

| Lap Shear Strength of Modified Urethane Adhesive | | |
|---|---|---|
| | | Control |
| Base | A3 | A4 |
| Curative | B7 | B10 |
| Isocyanate Index | 135 | 135 |
| 7113 SMC, RT Test 82° C. Test | 580 psi, 96 SF 4002 kpa 442 Psi, 95 SF 3050 kpa | 593 psi 100 SF (4090 kpa) 509 psi 100 SF (3510 kpa) |
| 7160 SMC, RT Test 82° C. Test | 636 psi, 99 SF 4388 kpa 517 psi, 96 3567 pka SF/2CF | 643 psi 100 SF (4430 kpa) 625 psi 100 SF (4310 kpa) |

Example 7

Six hat sections made from GenCorp 7113 and 7160 substrates were bonded with the modified urethane adhesive of Examples 3 and 4 and then a powder coating was applied. GenCorp 7113 and 7160 substrates are polyester 25–30 percent weight fiberglass reinforced unsaturated sheet-molded compounds. The procedure utilized was: a) bonding SMC substrates with adhesives of the present invention at 300° F. (149° C.) for 60 seconds, b) washing bonded substrates with an modified industrial soap solution (2 percent Detrex 2100L) and rinse the same with clean water, c) preheating the bonded SMC substrates in a paint line at 330°–375° F. (166°–191° C.) for 30 minutes, d) applying white TiO$_2$ powder coating, e) fusing powder coating at 270° F. (132° C.) for 30 minutes. As apparent from Table V, all hat sections passed the powder coating test.

TABLE V

| Base | A2 | A2 | A2 | A2 | A2 | A2 |
|---|---|---|---|---|---|---|
| Curative | B3 | B3 | B8 | B8 | B9 | B9 |
| Isocyanate Index | 135 | 135 | 135 | 135 | 135 | 135 |
| Urethane Catalyst | None | None | None | None | Yes (0.01) | Yes (0.01) |
| TMR | Yes | Yes | Yes | Yes | Yes | Yes |
| A-1120 Silane | None | None | Yes | Yes | Yes | Yes |
| Preheating SMC before coating | | | | | | |
| @ 330° F., 30 min. | Yes | — | Yes | — | Yes | — |
| @ 375° F., 30 min. | — | Yes | — | Yes | — | Yes |
| Powder Coating | Pass | Pass | Pass | Pass | Pass | Pass |

As noted above, a urethane catalyst need not be utilized, and yet blister-free coatings are obtained.

Example 8

Bonded substrates were prepared in a manner as set forth in the coating and curing procedure and results thereof are set forth in Table VI. As apparent from Table VI, the powder coating was blister free, however, due to the fact that a urethane catalyst was not utilized, they exhibited low green strength.

TABLE VI

| Base | A1 | A1 | A1 | A1 |
|---|---|---|---|---|
| Curative | B1 | B1 | B2 | B12 |
| Isocyanate Index | 135 | 135 | 135 | 135 |
| Urethane Catalyst | None | None | None | 0.2 |
| Trimerization Catalyst | TMR | TMR | TMAO | None |
| Preheating SMC before coating | | | | |
| @ 330° F., 30 min. | Yes | — | — | Yes |
| @ 375° F., 30 min. | — | Yes | Yes | — |
| Green Strength* | Fail | Fail | Fail | Pass |
| Powder Coating | Pass | Pass | Pass | Fail |

*Less than 50 PSI 345 (kpa)

As apparent from the above examples, it is seen that the modified polyurethane adhesives of the present invention result in powdered paint coatings that when applied to various substrates and cured result in coatings which are substantially blister free. By the term "substantially blister free" it is generally meant less than 5 blisters per sq. inch, desirably less than 3 blisters per sq. inch, and preferably, no blisters at all.

While in accordance with the Patent Statutes, the best mode and preferred embodiment has been set forth, the scope of the invention is not limited thereto, but rather by the scope of the attached claims.

What is claimed is:

1. A bonded fused powder-coated laminate, comprising;
   a substrate bonded to at least one other substrate with a primerless two part polyurethane adhesive, at least one of said substrates having an adhesive-free surface, said at least one adhesive-free surface having a powder coating thereon, said adhesive having a plurality of open network channels in the adhesive surface in contact with said substrate having said powder coated surface, said polyurethane adhesive being the reaction product of a two-component system of a urethane propolymer component and a urethane curative component, said urethane prepolymer component made from a hydroxyl terminated intermediate and a polyisocyanate, the equivalent ratio of said polyisocyanane to said hydroxyl terminated intermediate being from 2.0 to 75 so that said propolymer component contains free NCO groups, said urethane curative component comprising a nitrogen free polyol curative having OH groups therein, a polyamine containing NH$_2$ groups therein, and one or more trimerization catalysts, the equivalent ratio of said free NCO groups to said OH groups of said polyol curative and said NH$_2$ groups of said primary polyamine being at least 1.2, the amount of said one or more trimerization catalysts being from 0.01 percent to 1.0 percent by weight baded upon the total weight of said urethane curative component, and up to 0.049 percent by weight of a urethane catalyst based upon the total weight of said urethane prepolymer, said nitrogen-free polyol, said polyamine, and said trimerization catalyst, said urethane catalyst when utilized being other than said one or more trimerization catalysts.

2. A bonded fused powder-coated laminate according to claim 1, wherein substrates are fiber-reinforced plastics.

3. A urethane adhesive composition, comprising:
   a urethane adhesive, said urethane adhesive being the reaction product of a two-component system of a urethane prepolymer component and a urethane curative component, said urethane prepolymer component made from a hydroxyl terminated intermediate and a polyisocyanate, the equivalent ratio of said polyisocyanate to said hydroxyl terminated intermediate being from 2.0 to 75 so that said prepolymer component contains free NCO groups, said urethane curative component comprising a nitrogen free polyol curative having OH groups therein, a polyamine containing NH$_2$ groups therein, and one or more trimerization catalysts, the equivalent ratio of said free NCO groups to said OH groups of said polyol curative and said NH$_2$ groups of said primary polyamine being at least 1.2, the amount of said one or more trimerization catalysts being from 0.01 percent to 1.0 percent by weight based upon the total weight of said urethane curative components, and up to 0.049 percent by weight of a urethane catalyst based upon the total weight of said urethane prepolymer, said nitrogen-free polyol, said polyamine, and said trimerization catalyst, said urethane catalyst when utilized being other than said one or more trimerization catalyts.

4. A urethane adhesive composition according to claim 3, wherein said equivalent ratio of said polyisocyanate to said intermediate is from 2 to 50, and wherein said equivalent ratio of said free NCO groups to said OH groups of said polyol curative and said NH$_2$ groups of said primary polyamine is from 1.2 to 1.6.

5. A urethane adhesive composition according to claim 4, wherein the amount of said urethane catalyst is up to 0.035 percent by weight, wherein said urethane catalyst is a tertiary amine or an organic tin compound wherein said equivalent ratio of said free NCO groups to said OH groups and said NH$_2$ groups is 1.25 to 1.5, wherein said hydroxyl-terminated intermediate or said nitrogen-free polyol is polypropylene ether triol with grafted acrylonitrile, polypropylene ether triol, or polypropylene ether tetrol, wherein said polyisocyanate is MDI, and wherein said polyamine is naphthalene diamine.

6. A substantially blister-free powder coated substrate bonded to at least another substrate with a cured polyurethane adhesive wherein said polyurethane adhesive is the composition of claim 3, and wherein the surface of said polyurethane adhesive in contact with said powder coated substrate han an open channel network.

7. A substantially blister-free powder coated substrate bonded to at least another substrate with a cured polyurethane adhesive wherein said polyurethane adhesive is the composition of claim 4, and wherein the surface of said polyurethane adhesive in contact with said powder coated substrate has an open channel network.

8. A substantially blister-free powder coated substrate bonded to at least another substrate with a cured polyurethane adhesive wherein said polyurethane adhesive is the composition of claim 5, and wherein said bonded substrate surfaces are treatment free, and wherein the surface of said polyurethane adhesive in contact with said powder coated substrate has an open channel network.

9. A substantially blister-free powder coated substrate bonded to at least another substrate with a cured polyurethane adhesive wherein said polyurethane adhesive is the composition of claim 5, wherein said bonded substrate surfaces are treatment free, wherein said substrate is an fiber reinforced plastic, and wherein the surface of said adhesive bonded to said powder-coated surface has an open channel network.

10. A process for preparing a blister-free poser coated substrate, comprising the steps of:
    providing a heated, adhesive-free surface of a first substrate, said first substrate having another surface bonded with an adhesive to a second substrate, said adhesive being a modified polyurethane adhesive having an open channel network in the adhesive surface contacting said first substrane, said modified polyurethane adhesive comprising a urethane prepolymer component and a curative component, said urethane prepolymer component made from a hydroxyl terminated intermediate and a polyisocyanate, the amount of said polyisocyanate being an equivalent ratio of at least 2.0 based upon the hydroxyl terminated intermediate so that said prepolymer component has free NCO groups, said curative component comprising a nitrogen-free polyol curing agent, a polyamine, and one or more trimerization catalysts, the equivalent ratio of said free NCO groups to said curative OH groups and NH₂ groups of said curative component being at least 1.2, the amount of said one or more trimerization catalysts being from 0.01 percent to 1.0 percent by weight based upon the total weight of said urethane curative component, and up to about 0.049 percent by weight of a urethane catalyst based upon the total weight of said urethane prepolymer, said nitrogen-free polyol, said polyamine, and said trimerization catalyst, said urethane catalyst when utilized being other than said one or more trimerization catalysts, applying a powder coating to said heated surface, and curing said powder coating at a temperature above the curing temperature thereof.

11. A bonded, powder-coated laminate according to claim 1, wherein said hydroxyl-terminated intermediate or said nitrogen-free polyol is polypropylene ether triol with grafted acrylonitrile polypropylene ether triol, or, polypropylene ether tetrol, wherein said polyisocyanate is MDI, and wherein said polyamine is naphthalene diamine.

12. A bonded fused powder-coated laminate, comprising;

a substrate bonded to at least one other substrate with a primerless two part polyurethane adhesive, said substrates being a fiber reinforced plastic, at least one of said substrates having an adhesive-free surface, said at least one adhesive-free surface having a powder coating thereon, said adhesive having an open channel network in the adhesive surface in contact with said substrate having said powder coated surface, said polyurethane adhesive being the reaction product of a two-component system of a urethane prepolymer component and a urethane curative component, said urethane prepolymer component made from a hydroxyl terminated intermediate and a polyisocyanate, the equivalent ratio of said polyisocyanate to said hydroxyl terminated intermediate being from 15 to 35 so that said prepolymer component contains free NCO groups, said urethane curative component comprising a nitrogen free polyol curative having OH groups therein, a polyamine containing NH₂ groups therein, and one or more trimerization catalysts, the equivalent ratio of said free NCO groups to said OH groups of said polyol curative and said Nh₂ groups of said primary polyamine being from 1.25 to 1.5, and up to 0.035 percent by weight of a urethane catalyst based upon the total weight of said urethane prepolymer, said nitrogen-free polyol, said polyamine, and said one or more trimerization catalyst, said hydroxyl-terminated intermediate or said nitrogen-free polyol being polypropylene ether triol with grafted acrylonitrile, polypropylene ether triol, or polypropylene ether tetrol, said polyisocyanate being MDI, said polyamine being naphthalene diamine, and wherein said urethane catalyst when utilized is an organotin catalyst other than said one or ore trimerization catalysts.

13. A process according to claim 10, wherein said hydroxyl-terminated intermediate or said nitrogen-free polyol is polypropylene ether triol with grafted acrylonitrile, polypropylene ether triol, or polypropylene ether tetrol, wherein said polyisocyanate is MDI, wherein said polyamine is naphthalene diamine, wherein said equivalent ratio of said polyisocyanate to said hydroxyl-terminated intermediate is from 15 to 35, wherein said equivalent ratio of said free NCO groups to said OH groups of said polyol curative and said NH₂ groups of said primary polyamine is from 1.25 to 1.5, wherein the amount of said urethane catalyst is up to 0.035 percent by weight, and wherein said urethane catalyst is an organotin catalyst.

14. A bonded-powder coated laminate according to claim 2, wherein said powder coating is cured.

15. The polyurethane adhesive bonded substrates of claim 6, wherein said powder coating is cured.

16. The polyurethane adhesive bonded substrates of claim 9, wherein said powder coating is cured.

17. A process according to claim 13, wherein providing said heated surface comprises heating said surface to a temperature above the cure temperature of said powder coating.

* * * * *